United States Patent [19]

Mohn et al.

[11] Patent Number: 5,069,789
[45] Date of Patent: Dec. 3, 1991

[54] SPACER ELEMENT FOR GUIDING FLOWING MEDIUM

[75] Inventors: Jürgen Mohn, Reinbek; Wilhelm Heine, Hamburg, both of Fed. Rep. of Germany

[73] Assignee: DT Membranfilter Vertiebs GmbH, Hamburg, Fed. Rep. of Germany

[21] Appl. No.: 420,054

[22] Filed: Oct. 11, 1989

[30] Foreign Application Priority Data

May 10, 1989 [DE] Fed. Rep. of Germany ....... 3915197

[51] Int. Cl.$^5$ .............................................. B01D 29/39
[52] U.S. Cl. ................................ 210/321.84; 210/346; 210/488; 210/500.43
[58] Field of Search ....................... 210/321.75, 321.84, 210/331, 346, 483, 486, 487, 488, 500.43; 55/158

[56] References Cited

U.S. PATENT DOCUMENTS

| | | | |
|---|---|---|---|
| 3,464,562 | 9/1969 | Meyers et al. | 210/486 |
| 3,623,610 | 11/1971 | Olsen et al. | 210/346 |
| 3,623,614 | 11/1971 | Schmidt, Jr. | 210/486 |
| 3,971,722 | 7/1976 | Radford | 210/486 |
| 4,234,428 | 11/1980 | Schnell | 210/321.1 |
| 4,704,207 | 11/1987 | Chu | 210/486 |
| 4,765,915 | 8/1988 | Diehl | 210/767 |
| 4,832,119 | 5/1989 | Bloor et al. | 165/172 |

FOREIGN PATENT DOCUMENTS 3347283 10/1984 Fed. Rep. of Germany .
3327431 2/1985 Fed. Rep. of Germany .

*Primary Examiner*—Robert A. Dawson
*Assistant Examiner*—Wanda L. Millard
*Attorney, Agent, or Firm*—Robert W. Becker & Associates

[57] ABSTRACT

A spacer element for guiding flowing medium, especially for apparatus for separating the medium by reverse osmosis and ultrafiltration, with a respective filter element being accommodated between each two essentially plate-like spacer elements, about which the medium flows. The spacer element includes a plate member having a rim region in which is provided at least one passage for the flowing medium. The plate member has two oppositely disposed plate-like surfaces, on at least one of which are disposed a plurality of raised bosses that project from the surface, with the filter element resting on the bosses. The filter element is in the form of a diaphragm pad, with the medium flowing on both sides thereof.

9 Claims, 2 Drawing Sheets

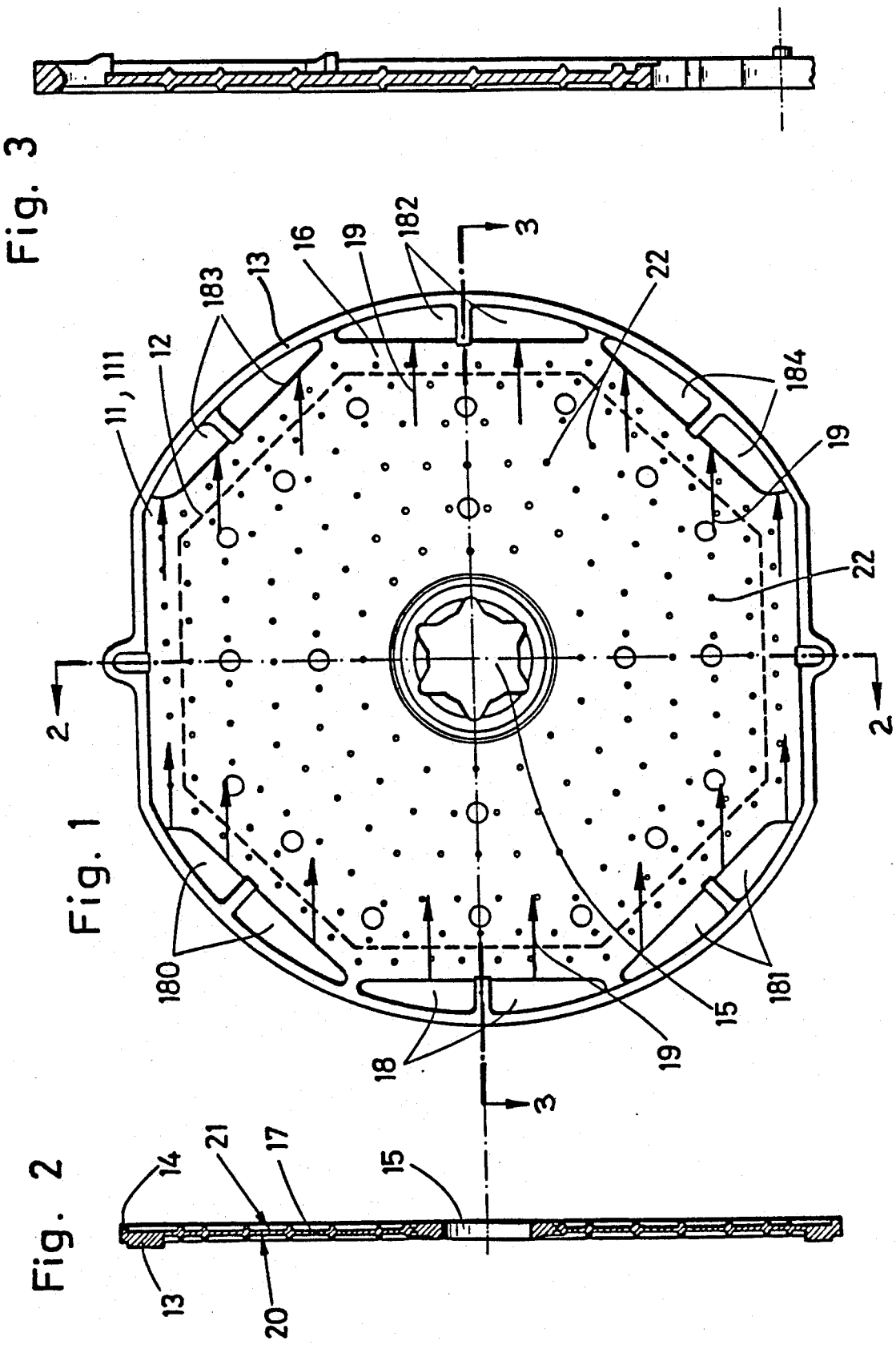

SPACER ELEMENT FOR GUIDING FLOWING MEDIUM

BACKGROUND OF THE INVENTION

1. Field of the Invention

The present invention relates to a spacer element for guiding flowing medium, especially for apparatus for filtering and separating the flowing medium by microfiltration, ultrafiltration, and reverse osmosis, with a respective filter element being accommodated between each two essentially plate-like spacer elements, about which the flowing medium flows.

2. Description of the Prior Art

A multi-part device for accommodating filter elements is known, for example, from the apparatus for separating and filtering flowing medium disclosed in German Offenlegungsschrift 33 27 431, where each individual filter unit of any desired number of filter element stacks comprises a carrier plate, a deflector plate, and accommodated therebetween, a diaphragm. With this known apparatus, the periphery of the diaphragm is adhesively joined to the periphery of the carrier plate within an axial passage.

Such a known compact construction of filter units to form a filter element stack is known as a so-called disk module. As a consequence of the individual filter units, the disks or plates have a relatively great inherent stability and must be provided with a relatively high pressure resistance since the type of diaphragm filter used there absolutely demands this.

Due to the construction of the heretofore known spacer elements and of the apparatus in which these known spacer elements are inserted, a considerable partial pressure drop occurs between the inlet (unfinished solution, i.e. solution that is only partially treated or not treated at all) and the outlet (retentate) of the flowing medium into and out of the apparatus since the flowing medium of these apparatus generally flow through from the inlet to the outlet in a series-type arrangement and in a meander-like way along the diaphragm filters that are held by the spacer elements or disks. An important reason for the considerable partial pressure drop, which generally has a disadvantageous effect, is that the diaphragm rests directly upon the carrier plate and/or upon the deflector plate, so that the flowing medium becomes increasingly obstructed as it flows through the filter element stack.

For certain applications, for such apparatus neither the known spacer elements, which are formed of carrier plates and deflector plates upon which up to now the diaphragm rests, nor the up to now conventionally used diaphragms, are suitable.

An apparatus is also known (German Offenlegungsschrift 33 47 283) where so-called diaphragm cushions or pads are used that comprise two outer thin diaphragm sheets that are hermetically sealed relative to flowing medium along their outer edges, and where the filtrate flows to a hole that is provided in the diaphragm pad and that, for example, is disposed essentially centrally therein, although this is not absolutely necessary, and from where the filtrate is suitably collected and supplied to a filtrate outlet.

The apparatus that have been known up to now and that have used conventional diaphragms are not suitable for cooperation with the aforementioned diaphragm pads, since with such pads it is not possible for the medium to flow on both sides of the diaphragm pad in order to fully utilize the advantages of the symmetrically constructed diaphragm pad. Tests have been conducted in which the diaphragm pad has been placed upon a carrier plate or deflector plate via the interposition of a spacer that is comprised of gauze or fabric. However, by using this measure the filter effect of one active surface of the diaphragm is practically not utilized, resulting in a considerable reduction in efficiency or non-utilization of the otherwise good separating capacity of such diaphragm pads.

It an object of the present invention to provide a spacer element that permits a good circulation of medium about the filter element, which is disposed on the spacer element and is in the form of a diaphragm pad, so that it is also possible to have a parallel arrangement of diaphragm pads in an apparatus and/or the series arrangement of several units of diaphragm pads arranged in parallel, in order to minimize the pressure drop of the flowing medium between the inlet and the outlet, whereby the diaphragm pads are to be accommodated in a manner that is essentially resistant to pressure differentials.

BRIEF DESCRIPTION OF THE DRAWINGS

This object, and other objects and advantages of the present invention, will appear more clearly from the following specification in conjunction with the accompanying schematic drawings, in which:

FIG. 1 is a plan view of one exemplary embodiment of the inventive spacer element, with the direction of flow of the flowing medium (unfinished solution) being indicated;

FIG. 2 is a cross-sectional view taken along the line 2—2 in FIG. 1;

FIG. 3 is an enlarged partial cross-sectional view taken along the line 3—3 in FIG. 1.

SUMMARY OF THE INVENTION

Figure 4:
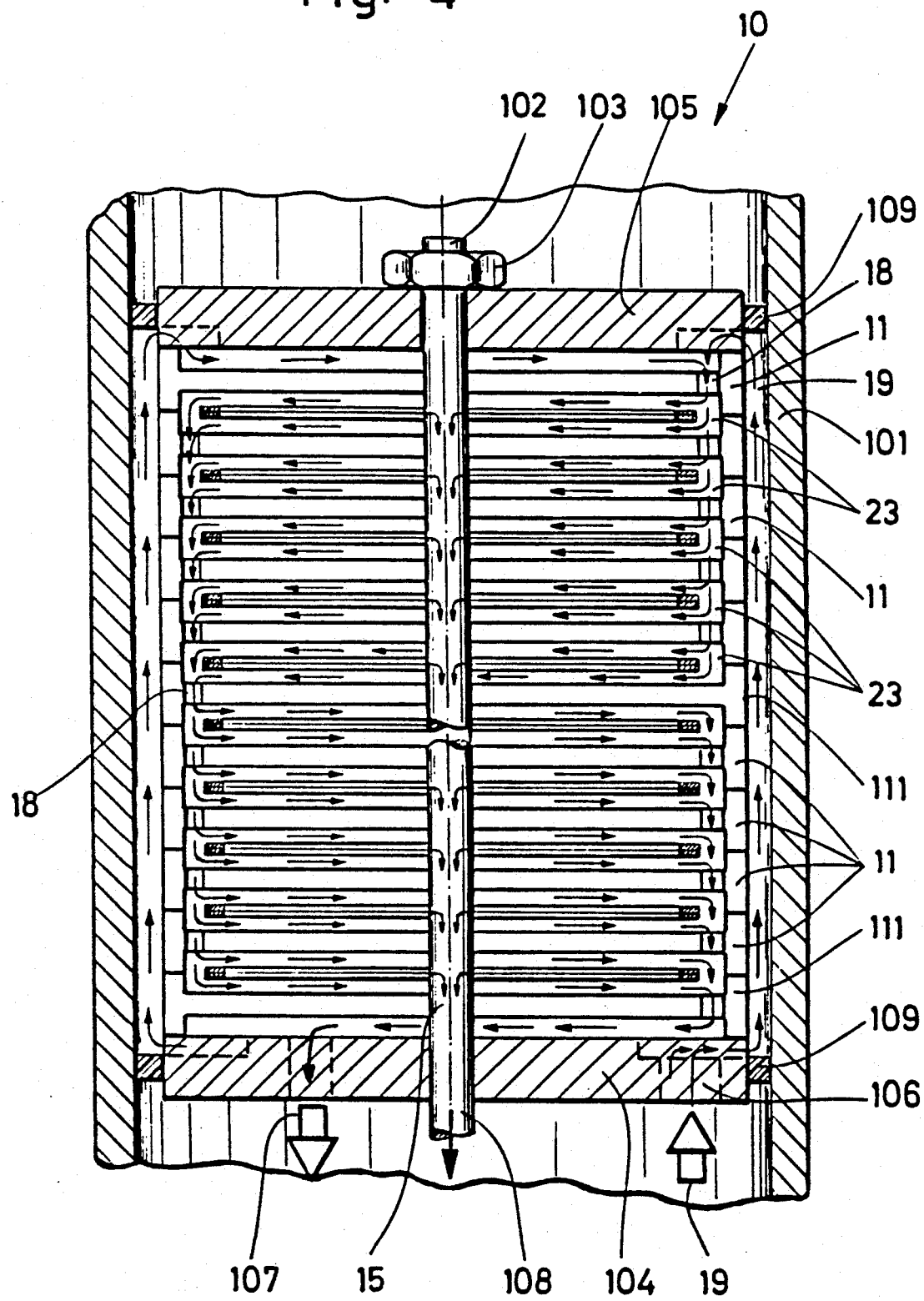
FIG. 4 is a cross-sectional view through an apparatus that is provided with two units of diaphragm pads that are arranged in parallel and are accommodated between the spacer elements, with the two units being arranged in series.

The spacer element of the present invention is characterized primarily in that it comprises a plate member having a rim region in which is provided at least one passage for the flowing medium, with the plate member having two oppositely disposed plate-like surfaces, on at least one of which are disposed a plurality of raised projections or bosses that project from this surface, with the filter element resting on the bosses whereby the filter element is in the form of a diaphragm pad, with the flowing medium flowing on both sides thereof.

The advantage of the inventive spacer element is essentially that the flowing medium, which passes over both sides of the diaphragm pad as unfinished solution over essentially the entire surface from one side to the other, has a practically non-obstructed flow, since the bosses have an only infinitesimally small contact surface with the diaphragm pads and therefore do not obstruct the flow of the medium, as a result of which similarly no inorganic deposits can form that prevent the flow of the medium and the filtering effect of the diaphragm pad, and the build-up of which, as was known up to now with contact surfaces of carriers for the diaphragm device, is prevented.

In order to be able to fixedly hold the diaphragm pads, which are generally fused together along the outer periphery, between the spacer elements, it is advantageous that the bosses have different heights, i.e. to make them higher in the rim region where the weld seam of the diaphragm pad is provided, so that at that location the diaphragm pad could also be reliably fixed.

Pursuant to one advantageous specific embodiment of the present invention, in a plane parallel to the surfaces of the filter element, the bosses are provided with an essentially circular cross-sectional configuration. Pursuant to an alternative advantageous specific embodiment, in a plane parallel to the surfaces of the filter elements, the bosses have an essentially spherical cross-sectional configuration, which can, however, also preferably be essentially tear-shaped, whereby such a tear-shaped cross-sectional configuration to a large extent prevents turbulence in the medium that is flowing past, and reduces a pressure loss.

Pursuant to another advantageous specific embodiment of the inventive spacer element, the latter is provided with an outer, essentially circumferential rim on both of its surfaces, whereby preferably one of the rims is raised from the surface by at least the thickness of a filter element.

In this connection, it should be noted that the spacer element need in no way be limited to a disk or plate having an essentially circular configuration. Rather, the design of the outer contours of the spacer element, i.e. as a circle, as any other suitable polygon, etc., depends upon the type of application of the spacer element in the apparatus. The filter element, which is embodied as a diaphragm pad, can also have any desired suitable outer contour, for example a circle, polygon, etc., whereby the outer contour of the selected spacer element need not necessarily coincide with the outer contour of the diaphragm pad accommodated therein.

For example, it has been shown to be advantageous to provide the spacer element with an essentially circular disk-like configuration, whereas the diaphragm pad accommodated therein, for example, advantageously can have an octagonal contour.

The spacer element itself, in principle, can be made of any desired suitable material that imparts to the spacer element a low weight, a high strength, and an ease of fabrication.

The spacer element is advantageously made of plastic, preferably ABS, which is particularly suitable where a high quality of the filtrate, for example drinking water quality or also high-purity water, is required.

The spacer element can also be made of standard polystyrene, SAN, or Luran(Polystyrol).

Further specific features of the present invention will be described in detail subsequently.

DESCRIPTION OF PREFERRED EMBODIMENTS

Referring now to the drawings in detail, the apparatus 10 for filtering and separating flowing medium 11 by reverse osmosis and ultrafiltration is illustrated by way of example in FIG. 4, which will subsequently be discussed first. A number of filter elements 12 and spacer elements 11 are stacked together in the apparatus 10 to form a filter element stack of predetermined length.

For a better understanding of the construction of the spacer element, the apparatus 10 will be explained in conjunction with filter elements 12 in the form of diaphragm cushions or pads. The apparatus 10 essentially comprises a tubular casing 101. Spacer elements 11 and filter elements 12 are alternately disposed in the casing 101, i.e. a filter element 12 is disposed between each two spacer elements 11. Only at the two ends of a filter element stack that is formed in this way does the spacer element have no filter element 12. At the connection end of the filter element stack a connection flange 104 is provided; at the opposite end of the filter element stack, a terminal flange 105 is provided. The filter element stack and the two flanges 104, 105 are held together by a central clamping bolt 102 that extends through appropriate central holes of all of the aforementioned elements, whereby at both ends of the filter element stack the clamping bolt 102 is provided with nuts 103 that hold the filter element stack together; for the sake of simplification, merely one of the nuts 103 is shown in FIG. 4. The filter element stack is sealed off in a known manner via gaskets or other seals 109 relative to the tubular casing 101 into which the filter element stack is placed.

Provided in the connection flange 104 is an opening or inlet 106 for the introduction of the flowing medium 19, which represents an unfinished solution that is to be separated (i.e. a solution that has not been treated at all or has not been completely treated), as well as an outlet 108 for the filtrate and an outlet 107 for the retentate.

Via the inlet opening 106 provided in the connection flange 104, the flowing medium 19 enters the interior of the casing 101, and in particular into the gap between the filter element stack and the inner wall of the casing 101. In this gap, the flowing medium 19 passes into the space formed between the terminal flange 105 and the adjacent spacer element 11. The flowing medium 19 is symbolized within the apparatus 10 by arrows.

In the apparatus 10 illustrated in FIG. 4, the uppermost spacer element 11 has only a single passage 18 for the flowing medium, with this passage being provided in the rim region 16 in the disk member. The flowing medium 19 passes through this passage 18 into a chamber 23 formed between two spacer elements 11 and, since several spacer elements 11 are disposed in such a way that the passages 18 are arranged one above the other, the flowing medium 19 passes into the chambers 23 of respectively adjacent spacer elements 11 disposed therebelow.

In the illustrated embodiment of FIG. 4, a unit is formed of five spacer elements 11 that are connected with one another in this manner.

As will be described in greater detail subsequently, a respective filter element 12 is disposed in each chamber 23. The flowing medium 19 that is in the chambers 23 sweeps or passes over both sides of a respective filter element 12 that is disposed in the chamber 23. In FIG. 4, the flow is from right to left flowing toward the left side of the spacer element 11, whereby in the rim portion in the disk member there is similarly formed a passage 182 for the flowing medium 19.

In the filter elements 12, which are disposed in the chambers 23 and are in the form of diaphragm pads, the filtrate is conveyed to an opening provided in the filter element 12, i.e. in the diaphragm pad. In the apparatus illustrated in FIG. 4, i.e. in the diaphragm pad 12 used therein, the aforementioned opening is a central opening. The filter elements 12, i.e. diaphragm pads, accommodated in the chambers 23 are sealed off relative to the spacer elements that confine them in a known manner in the region toward the filtrate outlet opening, which is symbolized by the central hole 15.

The spacer element 111 that in the illustration of FIG. 4 delimits the bottom of the aforementioned unit that is formed of five spacer elements 11 is provided, just as was the case with the uppermost spacer element 11, with merely a single passage 18 for the flowing medium 19, with this passage being provided in the rim region 16 in the disk member 17. As a result, as shown in FIG. 4, the flowing medium 19 can pass through the aforementioned spacer element 11 through only the single passage 18. Subsequently disposed is again a unit that is comprised of five spacer elements 11, whereby essentially oppositely disposed openings 18, 182 are provided for the flowing medium 19, so that, as described in conjunction with the upper unit, also in this second unit flowing medium 19 again passes over both sides of a plurality of filter elements 12 that are embodied as diaphragm pads. In the apparatus 10 illustrated in FIG. 4, the bottom of this unit is delimited by a spacer element 111 that again is provided with only a single passage 18 embodied in the rim region 16 in the disk member 17, so that through this passage 18, all of the concentrated flowing medium 19 (retentate) that leaves the apparatus 10 can leave the same through the outlet 107 that is formed in the connection flange 104.

The inventive spacer element 11 or 111 is illustrated in FIG. 1. In this embodiment, the spacer element is essentially formed by a circular disk member 17 that on two oppositely disposed sides is delimited in a chord-like manner, i.e. at these locations the disk member 17 deviates from a strictly circular shape.

The disk member 17 is provided with two essentially parallel disk-like surfaces 20, 21. The spacer element 11 or 111 is essentially formed by the disk member 17 and is provided on both sides of the disk-like surface 20, 21 with a rim 13, 14, which essentially completely defines the spacer element 11, 111. Formed in a region 16 of the rim of the spacer element 11, 111 that is, for example, formed by an imaginary chord and the rim 13, 14 that delimits the chord, is at least one passage 18 in the disk member 17 through which passes the flowing medium 19, as previously described. The passage of the flowing medium 19 through the passage 18 is symbolized in FIG. 1 by the arrows 19. In the illustrated embodiment of the spacer element 11, several of which are respectively disposed in the middle of the unit of the apparatus 10 of FIG. 4, formed on that side of the disk member 17 that is essentially opposite the one passage 18 is a further passage 182 which the flowing medium 19 again enters after it has passed over both sides of the octagonal filter element 11 that is indicated by dashed lines in FIG. 1. A plurality of further passages 180, 181 or 183, 184 can be disposed not only in the rim region 16 of the spacer element 11 in which the one passage 18 is provided, but also in the other rim region 16 in which the second passage 182 is disposed. These additional passages 180, 181 and 183, 184 ensure that the flowing medium 19 very uniformly sweeps across the filter element 12 that rests upon the spacer element 11, 111.

To definitely ensure that on the one hand the filter element 12 securely rests upon the spacer element 11, 111 while the flowing medium 19 passes by, and on the other hand, due to the support of the filter element 12 on the spacer element 11, 111, the contacted support surface is infinitesimally small, a number of raised projections or bosses 22 are provided on the disk-like surfaces 20, 21 and project therefrom, so that the diaphragm pad, about both sides of which the flowing medium 19 passes, rests merely on these bosses 22. In the plane parallel to the surfaces 20, 21, the bosses 22 can have any desired cross-sectional shape, although this shape is preferably circular and/or spherical. The highest portion of the bosses 22 that projects from the surfaces 20, 21 has a semicircular cross-sectional configuration, so that, as desired, even during operation of the apparatus 10 with the inventive spacer elements 11, 111 as well as the inserted diaphragm pads, these in fact rest only with an infinitesimally small surface upon the tips of the bosses. The plurality of bosses 22 disposed on the surface 20, 21 are disposed thereon in such a way that the flow of the medium 19 is not interrupted, so that the disadvantageous inorganic and organic diaphragm coatings or deposits, which have to be watched with other apparatus or filter elements, are also completely prevented by the suitably selected type and location for the disposition of the bosses 22 on the surfaces 20, 21.

The spacer element 11, 111 can be made of any suitable material, for example plastic such as polystyrene, acrylonitrile-butadiene-styrene (ABS), styrene-acrylonitrile polymer (SAN), Luran, or the like. It should be noted that in principle stainless steel is also suitable for the production of such spacer elements 11, 111.

The present invention is, of course, in no way restricted to the specific disclosure of the specification and drawings, but also encompasses any modifications within the scope of the appended claims.

What we claim is:

1. An arrangement including a spacer element for guiding flowing medium, particularly for apparatus for filtering and separating said flowing medium by microfiltration, ultrafiltration, and reverse osmosis, with a respective filter element being accommodated between each two essentially plate-like spacer elements, about which said medium flows, the improvement therewith wherein:

said spacer element comprises a plate member having a rim region in which is provided at least one passage for said flowing medium, with said plate member having two oppositely disposed plate-like surfaces, on at least one of which are disposed a plurality of raised bosses that project from said surface, with said filter element resting on said bosses, whereby said filter element is in the form of a diaphragm pad, with said medium flowing in transverse direction respectively diametrically on both sides thereof;

said spacer element having an outer, essentially circumferential rim on said two surfaces of said plate member thereof;

one of said rims being raised from said surface of said plate member by at least the thickness of one of said filter elements;

chamber means existing between respectively two adjoining spacer elements; and diaphragm pads located as supported by said bosses.

2. An arrangement according to claim 1, which further comprises a tubular casing as a housing in which a stack of spacer elements is installed between two sealingly inserted end disks as terminal flanges which respectively have a disk-shaped chamber means in pairs for insertion of filter elements therein.

3. An arrangement according to claim 2, in which said spacer elements are in essence circular-shaped disks with thickened edge portions which sealingly engage against each other from spacer element to spacer element respectively.

4. An arrangement according to claim 3, in which filter pads having at least two layers serve as filter elements, said filter pads along edges thereof being sealingly welded and including a central opening provided in a region for clamping bolt means providing an outlet for discharge of permeate.

5. An arrangement according to claim 4, in which said filter pads on outer sides thereof have flow diametral thereover, whereas permeate entering into interior of said filter pad flows in radial direction toward the central axis of the filtering apparatus wherein corresponding longitudinal grooves and passages of the clamping bolt are provided for discharge thereof.

6. An arrangement according to claim 1, in which five upper chamber means are provided as formed by space filter elements so that supplied flow medium enters to the right in parallel manner of flow and discharges to the left where discharge is again unified into retentate with five lower filter elements in parallel connection having entry of retentate at the left in order to discharge at the right thereof without any further connection with the five upper chamber means occurring via an upper portion of the stack including five diaphragm chambers having flow in parallel from the right to the left as well as having five lower membrane chambers having flow from the left to the right, with which however said retentate of the five upper elements is in effect the supply medium for the lower five membrane chamber means.

7. An arrangement according to claim 6, in which said five upper filter elements having parallel flow therethrough are connected in series with the five lower membrane elements, which likewise are provided in parallel connection so that an enlarged active diaphragm surfacing is attainable without increasing the diameter of the entire filter casing.

8. An arrangement according to claim 1, in which said spacer elements are so stacked upon each other that the inlet and outlet openings arranged within the surrounding edge portion thereof are located exactly one upon the other so that the spacer elements constructed in this manner assure a parallel flow at least an upper diaphragm chamber means therewith.

9. An arrangement according to claim 1, including a particular spacer element which other than the spacer elements operating in parallel connection has through-passage openings for the supply and discharge at two oppositely located sides thereof but rather includes only a single through-passage opening on one side thereof particularly at a distance from top location of the spacer element.

* * * * *